No. 724,824. PATENTED APR. 7, 1903.
R. DETTMER.
MEAT CHOPPER.
APPLICATION FILED JULY 8, 1902.
NO MODEL. 2 SHEETS—SHEET 1.
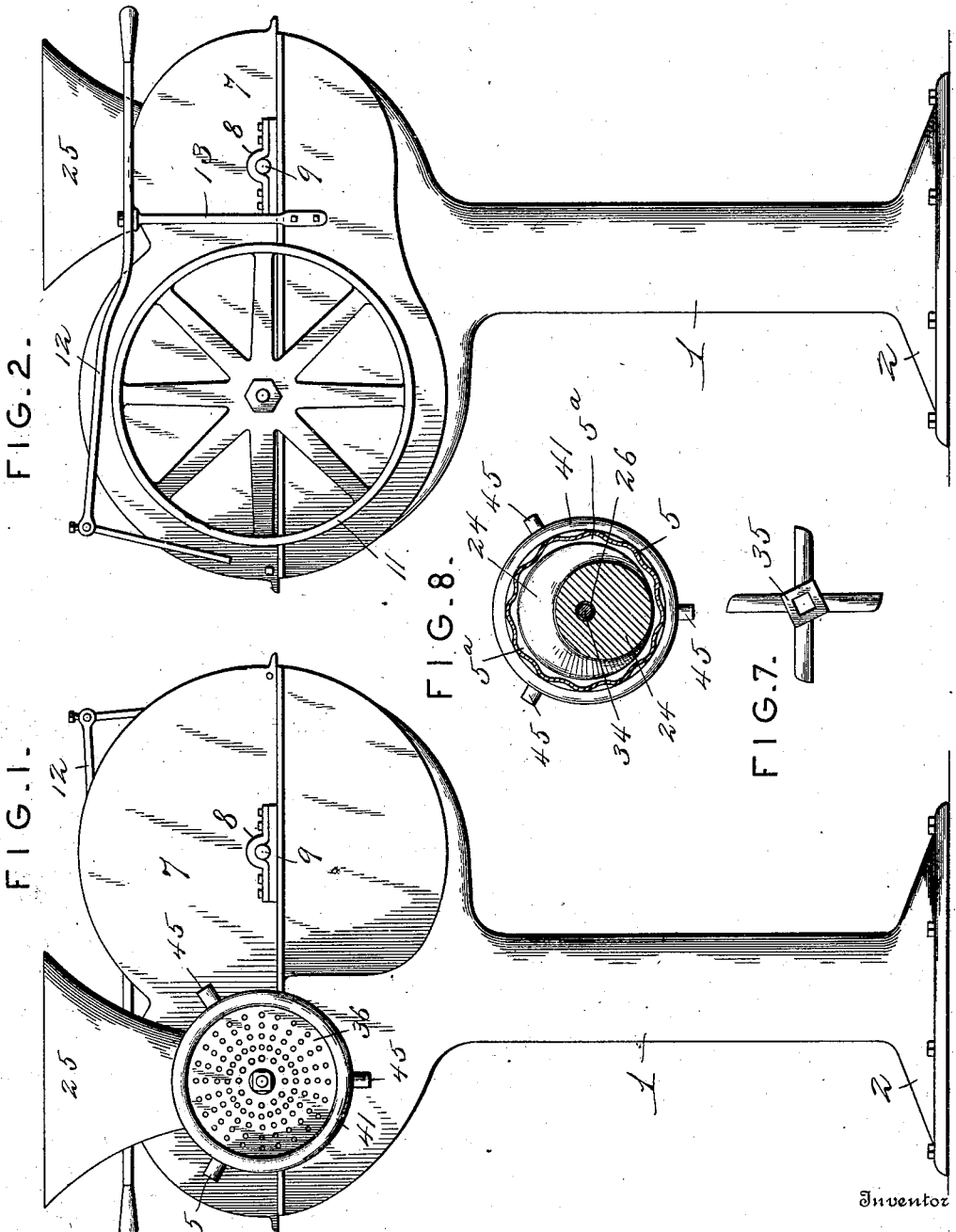
Witnesses
Harry L. Amer.
Chas. S. Hyer.
Inventor
Richard Dettmer.
By Victor J. Evans
Attorney No. 724,824. PATENTED APR. 7, 1903.
R. DETTMER.
MEAT CHOPPER.
APPLICATION FILED JULY 8, 1902.
NO MODEL. 2 SHEETS—SHEET 2.
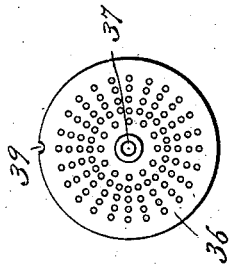
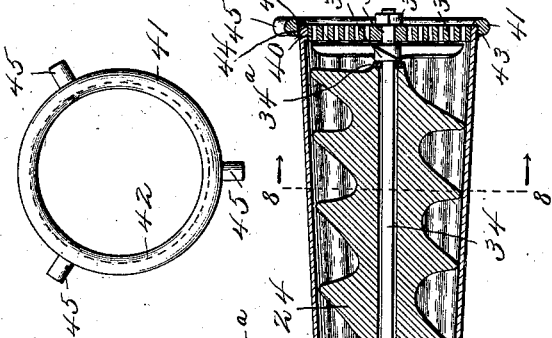
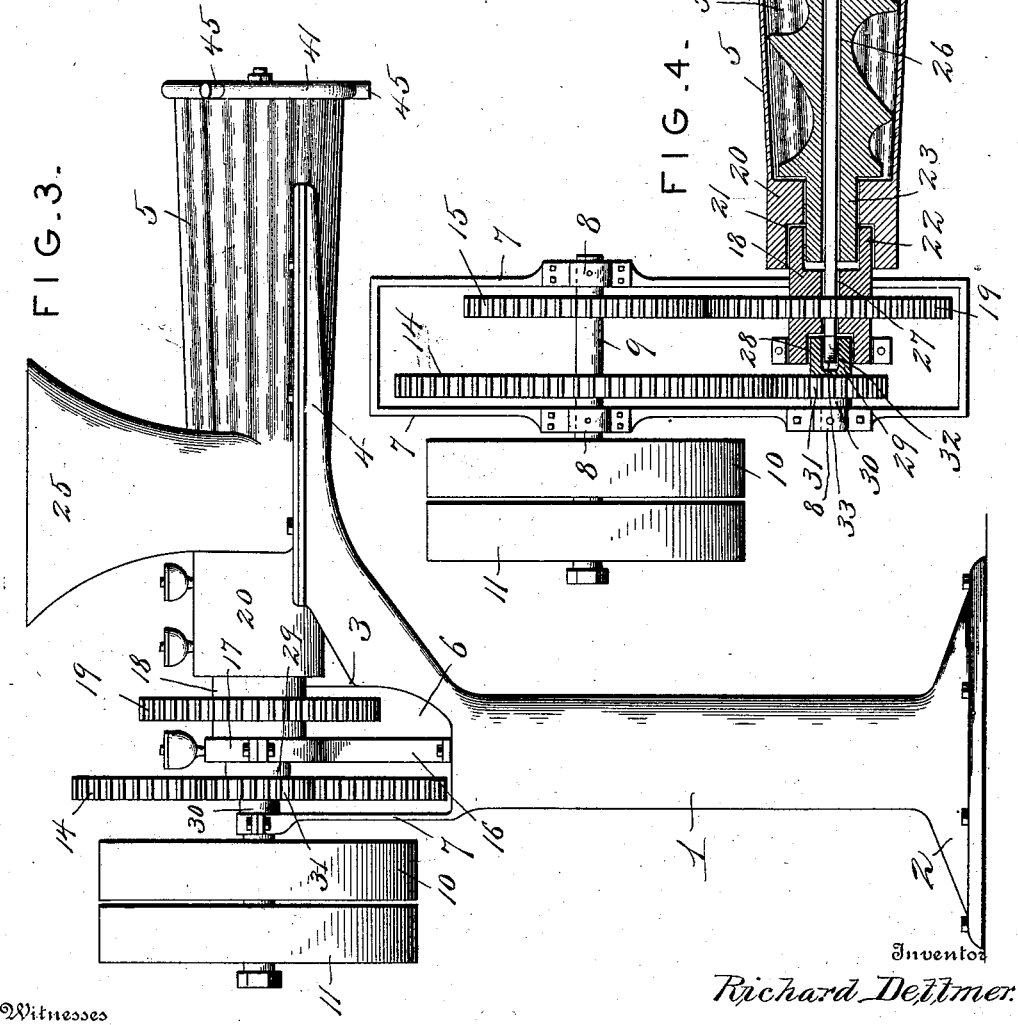
Witnesses
Harry L. Amer.
Chas. S. Hyer.
Inventor
Richard Dettmer.
By Victor J. Evans
Attorney
THE NORRIS PETERS CO., PHOTO-LITHO., WASHINGTON, D. C.

UNITED STATES PATENT OFFICE.

RICHARD DETTMER, OF OAKLAND, CALIFORNIA.

MEAT-CHOPPER.

SPECIFICATION forming part of Letters Patent No. 724,824, dated April 7, 1903.

Application filed July 8, 1902. Serial No. 114,816. (No model.)

*To all whom it may concern:*

Be it known that I, RICHARD DETTMER, a subject of the Emperor of Austria-Hungary, residing at Oakland, in the county of Alameda and State of California, have invented new and useful Improvements in Meat-Choppers, of which the following is a specification.

This invention relates to certain new and useful improvements in meat-choppers; and the essential object of the same is to provide an organization of elements whereby meat may be chopped as fine as desired by running it once through the machine without mashing the meat as much as when machines are used requiring the meat to be run through the same several times to obtain the degree of fineness desired and also to simplify the construction of this class of devices and render them more effective in their operation.

The invention consists in the construction and arrangement of the several parts, which will be more fully hereinafter described and claimed.

In the drawings, Figure 1 is a front end elevation of a meat-chopper embodying the features of the invention. Fig. 2 is a rear end elevation of the same. Fig. 3 is a side elevation of the improved machine. Fig. 4 is a top plan view showing the cylinder, feed-screw, and connecting parts in section. Fig. 5 is a detail view in elevation of one of the outlet-plates. Fig. 6 is a detail view in elevation of a clamping-ring to engage the outlet end of the cylinder to hold the outlet-plates in place. Fig. 7 is a detail elevation of the cutter. Fig. 8 is a transverse vertical section on the line 8 8, Fig. 4.

Similar numerals of reference are employed to indicate corresponding parts in the several views.

The numeral 1 designates a standard or upright having a base 2, adapted to be secured to a table or other support, the said standard or upright being also formed with and supporting an upper frame 3, comprising an outwardly-extending arm 4, having a cylinder 5 secured thereto. The interior of the cylinder 5 is formed with a series of longitudinally-extending shallow grooves, which will enable the screw hereinafter explained to feed the meat to a cutter, also forming a part of the improved organization. Immediately above the standard or upright 1 the frame 3 has an opening 6 therethrough for the reception and partial inclosure of elements, which will be hereinafter specified, and also to provide a closed combined shield and support 7 at the front and rear. The portion of the frame including the combined shields and supports 7 is extended laterally a considerable distance from one side of the machine, and in suitable boxes 8, secured to portions of the upper edges of the said combined shields and supports, a drive-shaft 9 is mounted and projected rearwardly a sufficient distance to receive pulleys 10 and 11, one of which is loose for obvious purposes. A belt from a suitable power source is adapted to engage the said pulleys, and coöperating therewith is a belt-shifter 12, fulcrumed on an upright 13 and having an arm held at an angle in the free end thereof and depending over a portion of the pulleys to engage the belt for shifting purposes, all as clearly shown by Fig. 2. Keyed on the shaft 9, within and close to the rear combined shield and support 7, is a master-gear 14, and also on the said shaft, adjacent to the front shield and support 7, is a smaller spur-gear 15. At a distance from the drive-shaft 9 and in alinement with the cylinder 5 a bearing-upright 16 is secured in the open portion of the frame and has a suitable box 17 of cap form on the upper end thereof to embrace the rear end of a hub 18, carrying a spur-gear 19, which is held in continual mesh with the spur-gear 15. The inner end of the cylinder 5 is provided with a head 20, having a shouldered opening 21 extending longitudinally therethrough, and into the larger portion of the said opening the outer end of the hub 18 rotatably extends, the said outer end of the hub being formed with a socket 22 of angular form to receive the correspondingly angular terminal stem 23 of a feed-screw 24 within the cylinder, whereby the said feed-screw will be regularly rotated at a given speed. The cylinder 5 gradually increases in diameter or diverges toward its outer free end, and the feed-screw 24 similarly increases in diameter, and communicating with the said cylinder is a hopper 25. The feed-screw has a bore 26 extending longitudinally therethrough, which alines with a bore 27 in the hub 18, and the rear end of said hub is constructed with a cylindrical socket 28 to receive the forwardly-projecting similarly-shaped extremity 29 of a hub 30, having a pinion 31 thereon, which is held in continual mesh with the master-gear 14. The hub 30 is provided with a shoulder, as shown, to bear against the adjacent box 8 to hold the spur-gear in proper position relatively to the socket 28. The forwardly-projecting extremity 29 of the hub 30 is also formed with an angular socket 32 to receive the rear angular end 33 of a cutter-shaft 34, which loosely projects through the bores 26 and 27, respectively, of the feed-screw 24 and the hub 18. The feed-screw 24 is not as long as the cylinder 5 in order to leave a space between the outer end of the said feed-screw and the closure for the outer end of the cylinder to provide sufficient room for the operation of a cutter 35, which is fast on the shaft 34 and comprises a series of radially-arranged obliquely-disposed cutting-blades. The sockets 22 and 32 are deep enough to compensate for wear and possible shifting movement of the parts directly engaging the same without creating a frictional bind on the said parts. Furthermore, the shaft 34 has a shoulder or stop device $34^a$ on the upper portion thereof close to the cutter 35 and which bears against the outer end of the feed-screw, the said shaft being held in position by a replaceable plate in the outer end of the cylinder, in the center of which snugly fits the shaft 34.

From the foregoing description it will be seen that the cutter will be rotated at a high rate of speed and the feed-screw at a much lower speed to prevent choking the cutter and permit the latter to effectively perform its cutting operation.

One of the most important features of the present construction and improvement in choppers is the provision at the outer free end of the cylinder of perforated plates of circular form, which will be furnished in series with each machine, with openings therein varying in diameter to regulate the fineness or grade of the cut meat delivered from the machine. Each of these plates 36 will be of such diameter as to snugly fit within the outer free end of the cylinder 5 and is provided with a central opening 37, through which a portion of the shaft 34 beyond the cutter 35 extends, and on the outer end of the shaft a nut 38 is applied and is brought to bear against the plate 36. The portion of the shaft 34 engaging this outlet-plate 36 freely rotates in the latter, and it is preferred for obvious practical reasons that the said plate be prevented from rotating, and to obstruct said movement of the plate it is formed with a peripheral notch 39 to engage a rib 40 on the inner side of the cylinder, as clearly shown by Fig. 4. In view of the fact that the outlet-plate 36 might move out of place if there were no restraining device to overcome this tendency a clamping-ring 41 is provided and formed with an inner groove 42, as clearly shown by Figs. 4 and 6, said groove being screw-threaded, as at 43. The outer end of the cylinder 5 has outer screw-threads 44 to engage the threads 43, and when the ring is applied the plate 36 is pushed snugly inward to the cutter and also brings the latter close to the end of the feed-screw. It will be seen that the ring 41 will overcome any tendency of abnormal expansion or outward movement of the outer end of the cylinder, due to the pressure of the meat at said point, and particularly in view of the operation of forcing the cut meat through the openings of the plate 36. To assist in turning the ring 41, it has a number of outwardly-projecting grip devices 45, and it will be seen that one plate 36 may be quickly removed and another substituted therefor by simply withdrawing the ring and detaching the nut 38 and afterward resetting the parts, as shown by Fig. 4. In some instances the nut 38 will not be necessary on the outer end of the shaft 34; but in doing heavy work, as in chopping cords and muscles in the meat, the said nut will be employed. The plate 38, shaft 34, and feed-screw 24 are all removable parts and are detached by first unscrewing or disconnecting the ring 41, when said parts can be successively taken out and cleaned and afterward reset in operative position within the cylinder.

In the operation of the machine the driving-belt is shifted to the pulley fast on the shaft 9, and through the gearing set forth the feed-screw and cutter-shaft are actuated in proper timed relation. The meat is then deposited in the hopper 25 and passes into the cylinder 5 and is carried or fed by the screw 24 to the cutter 35, where it is chopped or comminuted. The meat will not be forced through the outlet-plate 6 until the pieces are fine enough or of a size similar to the diameter of the openings in the said plate, and it will be seen that when it is required that the meat be cut very fine to pass through a plate having openings of reduced diameter the cutter will continue to operate on the meat or cut the latter until the necessary degree of fineness results.

The speed of the several parts may be varied at will; but it has been found that the operation of the machine is rendered more effective by rotating the pulleys at a speed of from three hundred and fifty to four hundred revolutions a minute and also to maintain the revolutions of the knife relatively to the feed-screw in a proportion of four to one. It is also obvious that changes in the form, proportions, and minor details may be resorted to without in the least departing from the spirit of the invention.

Having thus fully described the invention, what is claimed as new is—

1. In a meat-chopper, the combination of a cylinder having a head at its inner end with a shouldered opening therethrough, a feed-screw rotatably mounted in the cylinder and of less length than the latter, a cutter-shaft loosely extending through the feed-screw and having a cutter on its outer extremity, a perforated closure for the outer end of the cylinder, a hub carrying a spur-gear and having a socket in its outer end to receive the inner end of the feed-screw and also provided with a bore extending therethrough and a socket in its inner end, the said cutter-shaft extending through the bore of the hub, a hub having a pinion thereon projecting into the socket in the inner end of the hub carrying the spur-gear and also provided with a socket to receive the inner end of the cutter-shaft, and means for operating the said spur-gear and pinion.

2. In a meat-chopper, the combination of a cylinder having a feed-screw therein with a bore therethrough, the feed-screw being of less length than the cylinder, a hub carrying a spur-gear and having a socket to receive the rear end of the feed-screw and also provided with a bore therethrough in alinement with that of the said feed-screw, another hub rotatably projecting into the rear end of the hub carrying the spur-gear, and formed with a socket and having a pinion thereon, a cutter-shaft loosely extending through the feed-screw, the hub carrying the spur-gear, and terminally engaging the socket of the hub having the pinion thereon, a perforated closure for the outer end of the cylinder, a cutter mounted on the shaft between the closure and the outer end of the feed-screw, and means for operating the said spur-gear and pinion.

In testimony whereof I affix my signature in presence of two witnesses.

RICHARD DETTMER.

Witnesses:
CHAS. JURGENS,
PHILIP FICKINGER.